(12) United States Patent
Hazen et al.

(10) Patent No.: US 11,577,541 B2
(45) Date of Patent: Feb. 14, 2023

(54) METHOD AND APPARATUS FOR HEAT RESISTANT COATINGS

(71) Applicant: HAZEN PAPER COMPANY, Holyoke, MA (US)

(72) Inventors: John Hazen, South Hadley, MA (US); Larry Hoague, Feeding Hills, MA (US)

(73) Assignee: Hazen Paper Company, Holyoke, MA (US)

( * ) Notice: Subject to any disclaimer, the term of this patent is extended or adjusted under 35 U.S.C. 154(b) by 87 days.

(21) Appl. No.: 16/361,372

(22) Filed: Mar. 22, 2019

(65) Prior Publication Data

US 2020/0298609 A1 Sep. 24, 2020

(51) Int. Cl.

| | |
|---|---|
| *A61J 1/03* | (2006.01) |
| *B65D 75/36* | (2006.01) |
| *B42D 25/328* | (2014.01) |
| *B42D 25/36* | (2014.01) |
| *B42D 25/355* | (2014.01) |
| *B42D 25/21* | (2014.01) |
| *B42D 25/45* | (2014.01) |
| *B65B 11/50* | (2006.01) |

(52) U.S. Cl.
CPC ............ *B42D 25/36* (2014.10); *A61J 1/03* (2013.01); *B42D 25/21* (2014.10); *B42D 25/328* (2014.10); *B42D 25/355* (2014.10); *B42D 25/45* (2014.10); *B65B 11/50* (2013.01); *B65D 75/36* (2013.01); *B65D 75/367* (2013.01)

(58) Field of Classification Search
CPC .................. B65D 75/36; A61J 1/035
See application file for complete search history.

(56) References Cited

U.S. PATENT DOCUMENTS

| | | | | |
|---|---|---|---|---|
| 4,856,857 | A * | 8/1989 | Takeuchi | B42D 25/46 359/3 |
| 5,946,781 | A * | 9/1999 | Kuo | B32B 15/08 156/233 |
| 10,633,160 | B2 * | 4/2020 | Wessely | B65D 75/327 |
| 10,865,026 | B2 * | 12/2020 | Wessely | B65D 65/40 |
| 2018/0110679 | A1 * | 4/2018 | Devens | B65B 9/045 |

FOREIGN PATENT DOCUMENTS

JP        10129107 A  *  5/1998

OTHER PUBLICATIONS

Amorphous and Semi-Crystalline Polymer List https://www.essentracomponents.com/en-GB/news/product-resources/the-difference-between-amorphous-and-semi-crystalline-plastics (Year: 2018).*
Glass Transition Temperatures of Plastics https://omnexus.specialchem.com/polymer-properties/properties/glass-transition-temperature (Year: 2021).*
JP-10129107-A English Translation (Year: 1998).*

* cited by examiner

*Primary Examiner* — Kyle R Grabowski
(74) *Attorney, Agent, or Firm* — Bulkley, Richardson and Gelinas, LLP; Mary R. Bonzagni, Esq.

(57) ABSTRACT

A blister pack includes a housing having a plurality of cavities and a cover sealed to the housing and enclosing the cavities. The cover including a base layer, at least one security element, and a heat protective layer. The heat protective layer includes one of an amorphous polymer and a semi-crystalline polymer.

15 Claims, 2 Drawing Sheets

METHOD AND APPARATUS FOR HEAT RESISTANT COATINGS

FIELD OF THE INVENTION

The present invention relates, generally, to heat resistant coatings, and more particularly, to heat resistant coatings and films for the protection of security elements as imprinted on, or adhered to, a substrate.

BACKGROUND OF THE INVENTION

Coatings, i.e., films, are widely used as physical barriers to seal items into their packaging. Often, they are known as "lidding films", such as when used in connection with blister packs in the packaging of pharmaceutical medicaments. As is understood by those of ordinary skill, the presence of the film serves to provide a physical barrier to the egress of, e.g., the medicament from the individual blister cavities in the aforementioned blister pack. Puncturing of the physical film is therefore required before any of the product housed within the closed cavities may be dispensed. Such a physical barrier not only securely holds the product against undesired egress, but also provides a measure of tamper-evident security protection, as an intended user may observe any deterioration of the physical barrier and know thereby that tampering or damage may have affect the sealed product.

Beyond concerns over the physical integrity of the packaging as accomplished by the lidding/sealing barrier, additional various mechanisms have been created so as to give a visual indication of, e.g., the source of the packaged goods, and/or the unadulterated condition of the goods themselves. Thus, in certain industries, such as the pharmaceutical or electronics industries, security insignia and other visual markings are often imprinted or deposited onto the physical barrier/film to serve as an indication of whether, e.g., the drugs contained in a blister pack are authentic and unadulterated. To this end a number of security elements designed to deter would-be counterfeiters may be incorporated into, or deposited upon, the film. One such known security deposition are holographic or other fine-structured imagery or elements. As will therefore be appreciated, a premium is placed on maintaining the integrity of the security elements.

Problems exist, however, for packaging that utilizes, e.g., holographic or other deposited and/or imprinted security elements, in that these elements are often distorted or otherwise damaged during the heat sealing process that is integral to many packaging procedures. That is, in many known packaging systems that utilize a lidding or physical barrier, e.g., medicament blister packs, the progenitor physical barrier/film is first imprinted or deposited with various security elements, e.g., holographic elements, before the imprinted film is thereafter sealed to the blister pack. The sealing process typically involves utilizing a heated sealing die to press upon, and thereby seal, the physical barrier/film to the packaging of the blister pack.

It has long been known that this type of sealing process may tend to destroy the integrity of any, e.g., holographic element(s) imprinted or deposited upon the physical barrier/film, and so the relevant art is replete with differing die structures, each having specialized cavities and areas of differing heat profiles, all in an effort to protect those areas of the physical barrier/film having security elements from localized, excessive heat and the resultant degradation that would otherwise be incident upon these security elements during the sealing process.

As will be appreciated, the use of specialized sealing dies adds many levels of complexity and expense to the manufacturing and sealing process.

For their part, those of ordinary skill in the deposition or imprinting of security elements, i.e., holographic elements, have long utilized a series of various coatings and films so as to cover the deposited security elements from physical degradation during manufacture and shipping. That is, security forms/elements are typically deposited or imprinted upon, e.g., a lidding sheet or other substrate when positioned on a planar platen, before being rolled up for eventual storage and/or shipping. These rolls of coated substrate can be quite large, weighing over a ton or more, and so induce a great amount of pressure upon the surface of the coated substrate, including upon the holographic elements thereon.

A collection of known chemical coatings/films have long been recognized as being able to protect any deposited or imprinted forms/elements from frictional and pressure damage, and these coatings are typically applied for this purpose during the deposition stage, so as to protect the security forms/elements from damage when the substrate is rolled and thereafter stored or shipped.

The present invention has recognized that some of the coatings typically utilized to protect security elements from damage during shipping may also provide sufficient heat resistance to security elements when so coated with the same.

Thus, it is a primary aspect of the present invention to propose a method and apparatus that can effectively protect deposited or imprinted security elements from damage during a heat sealing process, without the need for structurally complex and expensive sealing dies.

SUMMARY OF THE INVENTION

According to one embodiment of the present invention, a method of protecting security elements deposited on a substrate from heat degradation during a heat sealing process includes defining a security element on the substrate, coating the security element with a heat resistant coating formed from a semi-crystalline polymer, and sealing the coated substrate to a package housing.

According to another embodiment of the present invention, a method of protecting security elements deposited on a substrate from heat degradation during a heat sealing process includes defining a security element on substrate, coating the security element with a heat resistant coating formed from a semi-crystalline polymer, defining a thickness of the semi-crystalline polymer in dependence upon a predetermined heat profile to be used during the heat sealing process, and sealing the coated substrate to a package housing with the predetermined heat profile.

According to yet another embodiment of the present invention, blister pack includes a housing having a plurality of cavities and a cover sealed to the housing and enclosing the cavities. The cover includes a base layer, at least one security element, and a heat protective layer. The heat protective layer is comprised from one of an amorphous polymer and a semi-crystalline polymer in order to provide for heat resistance during the sealing of the cover to the blister pack housing.

BRIEF DESCRIPTION OF THE DRAWINGS

Features and advantages of embodiments of the present invention will become apparent on reading the detailed description below with reference to the drawings, which are illustrative but non-limiting, wherein.

DETAILED DESCRIPTION OF THE INVENTION

Figure 1:
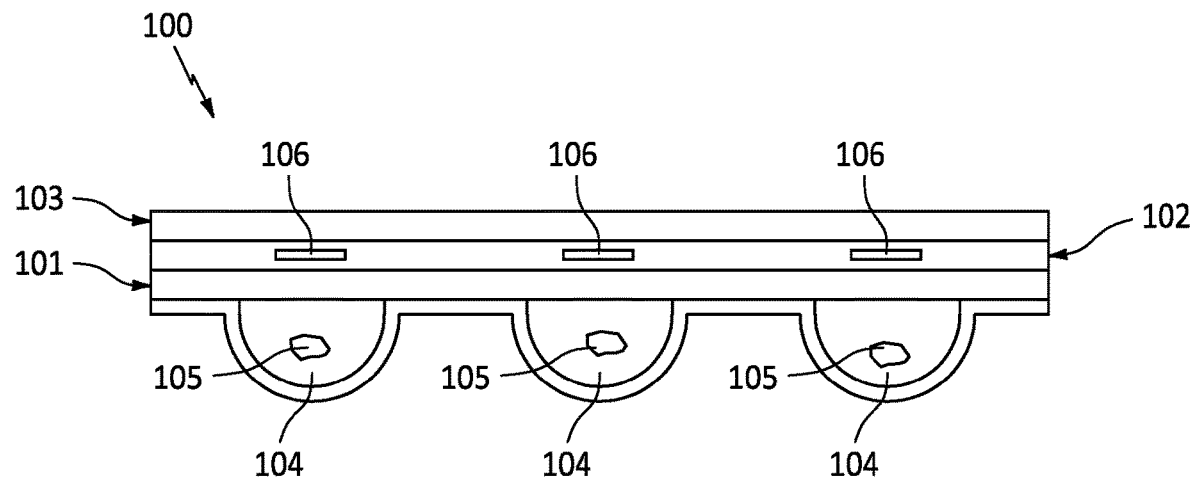
FIG. 1 is a cross-sectional view of an embodiment of a heat resistant multi-layer film.

Reference will be made below in detail to exemplary embodiments of the invention, examples of which are illustrated in the accompanying drawings. Wherever possible, the same reference characters used throughout the drawings refer to the same or like parts, without duplicative description.

While embodiments disclosed herein are described with respect to a coatings and films used to protect security elements integrated into the lidding material of pharmaceutical blister packs, the present invention is not so limited in this regard. IN particular, it is contemplated that the inventive coatings and films may be utilized in any application where heat protection of a deposited or printed element on a substrate is desired including, but not limited to, security papers, product packaging, lidding, and the like.

As used herein, the terms "substantially," "generally," and "about" indicate conditions within reasonably achievable manufacturing and assembly tolerances, relative to ideal desired conditions suitable for achieving the functional purpose of a component or assembly.

Moreover, the term "multi-layer film" or "film" refers to a multi-leveled material that usually takes the form of a sheet when assembled. Individual layers may be of uniform material or have multiple materials incorporated into a single layer. An individual layer may also be comprised of sub-layers with individual properties. Materials comprising the various layers may be formed and bound together in any number of orders using any of the various techniques known in the art. Certain layers may be a continuous sheet at time of application, other layers may be formed by discrete deposition (e.g., sprayed on inks or polymers, floating a liquid that then cures, etc.).

The term "primer", as used herein, refers to a material applied to a layer in order to prepare it for a subsequent step. A primer may also be an individual layer as part of a multi-layer film, part of a layer, or in between layers. In some embodiments a primer material may serve more than one particular function (e.g., to prepare a surface for printing while serving as a protective barrier). Primer material may be formed or deposited on an adjacent surface. In certain embodiments the primer may be a polymer sheet. In certain other embodiments the primer may be sprayed on and cured.

Also, as used herein the term "blister pack" refers to a type of packaging wherein cavities formed in a first material are subsequently sealed using a lidding film. A lidding film may be a multi-layer film or may be composed of a single material.

Also, as used herein the term "security element" refers to elements designed and/or configured to combat counterfeiting, thus providing assurance to the consumer that products contained in packaging sealed by the film are genuine and unadulterated. In some embodiments the counterfeit-deterrence measure may be a hologram. In some embodiments the counterfeit-deterrence measure may be microprinted words or images that may also be a part of a hologram. In other embodiments an embossed pattern may be imposed over the surface of a layer. In other embodiments a security strip may be embedded in the layer. The above examples may appear alone or in combination with each other and other similar measures. A counterfeit-deterrence measure may be part of a layer or sub-layer with multiple measures alone or in combination appearing as either an individual layer, part of a sub-layer, or in combinations thereof.

As used herein, the term "semi-crystalline" polymer refers to a material comprised of a collection of polymer macromolecule chains having a morphology consisting of crystalline lamellae separated by amorphous regions. Such a material may be in the form of a sheet or otherwise formed or deposited in place as part of a multi-layer film. Alterations to side-chain groups and the presence or absence of plasticizing agents may affect the final structure and distribution of the crystalline lamellae and amorphous regions in the semi-crystalline polymer material. Semi-crystalline polymers are characterized by a glass transition temperature ("$T_g$") at which the semi-crystalline polymer material undergoes a second order transition with a concomitant change in heat capacity. In some embodiments, at or above $T_g$, significantly more heat may be added to the polymer without a greater rise in temperature. Likewise, "amorphous" polymers have no crystalline lamellae and also undergo a glass transition change at a glass transition temperature $T_g$.

Turning now to FIG. 1, a multi-layer construct 100 showing use of a heat resistant coating 103 according to one embodiment of the present invention, is illustrated. The multi-layer construct 100 includes a base layer/substrate/housing 101, a security layer 102, and the heat resistant protection layer 103. As shown in FIG. 1, the multi-layer construct 100 reflects a blister pack having a plurality of wells 104 for retaining product 105 therein. As will be appreciated, the layers shown in FIG. 1 are not drawn to scale and sizes are exaggerated to better illustrate component parts. Moreover, it will also be appreciated that the product 105 may be anything that can be sealed in such a package. Examples can include: pharmaceuticals, electrical components, and sterilized medical supplies, amongst others.

As will be appreciated by one of ordinary skill, the base layer 101 may be made of any material without departing from the broader aspects of the present invention. Indeed, the base layer 101 may be made of paper of various weights, thicknesses, and surface finishes. In other embodiments base layer 101 may be a metallic foil, likewise of various weights, thicknesses, and surface finishes. In an embodiment, adhesives may be applied to base layer 101 in order to adhere the multi-layer film onto a surface. The adhesives may be heat activated, optically activated (e.g., UV light cured); or configured for attachment to blister pack 104 by mechanical means (e.g., "knurled" or textured together; or, flowing and freezing into textured surface crevices).

As also shown in FIG. 1, the security layer 102 contains discreet security elements 106 that are imaged, printed or otherwise deposited upon the base, or lidding, layer 101. In other embodiments, the security layer 102, itself, may define a security element. Regardless, and as shown in the embodiment of FIG. 1, the security elements 106, are located above the opening of the wells 104, although one or more security elements 106 may be placed at any location within security layer 102 and with respect to the wells 104, without departing from the broader aspects of the present invention.

For its part, the heat resistant protection layer 103 is composed of a semi-crystalline polymer material, preferably having crystalline lamellae separated by amorphous regions. It is an important recognition of the present invention that by controlling the ratio, composition, and nature of the crystalline lamellae (e.g., high turned, or tilt-angled), as compared to the amorphous regions, which thereby essentially controls the $T_g$ of a particular polymer material. In the illustrated example shown in FIG. 1, a heat-activated adhesive may be applied to the interface between the base layer 101 and the material of the blister pack. In other embodiments, the heat resistant protection layer 103 is composed of a substantially homogeneous amorphous polymer material with a $T_g$.

In use, a plurality of security elements 106 are printed, impregnated or otherwise deposited upon the base layer or substrate of a package, such as the base layer 101 of the blister pack shown in FIG. 1. This combined base layer 101 plus security elements 104 must then be sealed to the material of the blister pack. Typically, this sealing process involves the application of heat, to melt or otherwise cause the material of the combined base layer 101 and security elements 106 to become affixed to the material of the blister pack. It will be readily appreciated that it is of utmost importance that the heat sealing process does not destroy or otherwise deform or degrade the security elements 106, during the sealing process.

By applying heat at a temperature at or below $T_g$ of the polymer material and above the activation temperature of the adhesive, the heat resistant protection layer 103 does not deform or transmit excess heat to security elements 106, thus preserving the structure of security elements 106. At temperatures above $T_g$ the heat capacity of the semi-crystalline or amorphous polymer material increases, providing additional thermal protection should any process deviations occur (e.g., unexpected increase in temperature).

It is therefore an important aspect of the present invention that it is possible to protect security elements formed on a substrate from the damaging effects of a heat sealing operation through the use of the heat resistant protection layer 103, alone. In this manner, the security elements 106 are adequately protected from the heat of the sealing process, all without the need for sophisticated heating dies, having complex architecture and differing areas of heat conductivity, as is currently known and employed in the art.

In some embodiments the protection layer 103 is composed of poly(methyl methacrylate) ("PMMA"). As an example, a multi-layer construct 100 with a heat resistant protection layer 103 composed of PMMA is applied to a blister pack 104 using an application temperature range of 135-160° C. and commonly at a temperature of about 147° C. (dependent upon blister pack material composition, adhesives (if present), and specific multi-layer construct 100 composition). This is lower than the $T_g$ of 165° C. of some common formulations of PMMA. Indeed, dependent upon other co-polymers, side chain compositions, presence of plasticizers, free volume of the polymer material, etc. PMMA formulations may have a $T_g$ in the range of 85-165° C. Thus, in practice, a protective film may be formed from polymer materials chosen to have a $T_g$ above the application temperature range. Other suitable, commercially available polymers can include, but are not limited to: CF7157 from Amcor; CF92997 CABNC; CF5317 UTR; CF90147 Enhanced UTR; CF7427 HTNH.

Figure 1A:
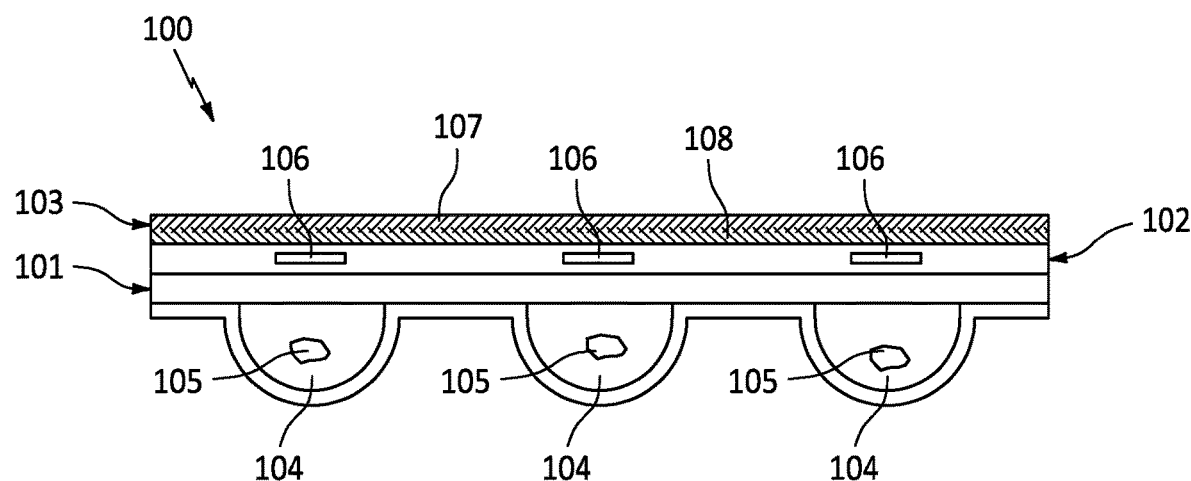

The heat resistant protection layer 103 may further serve and be configured as a primer enabling the deposition of inks or other materials. Thus, in some embodiments, inks may be "overprinted" on top of the protection layer 103. As will also be appreciated, the protection layer 103 may be the final layer in the multi-layer film, or it may be beneath or between one or more layers. In some embodiments, the protection layer 103 may vary in thickness with thicker or thinner areas corresponding to areas needing more or less protection. In some embodiments the protection layer 103 may contain an embossed design that also serves as a counterfeit deterrence measure on its own or as part of security elements 106. In still other embodiments, as shown in FIG. 1A, protection layer 103 may contain two or more polymer materials 107, 108, with two or more $T_g$s. The two or more polymer materials may be in discrete patches or may be continuous and/or contiguous with each other with either blended transitions between polymer materials or defined transitions.

In an embodiment, the heat resistant protection layer 103 may be deposited directly atop the base layer 101 or the security layer 102 (with security elements 106) through the use of a spray applicator or liquid coating. In other embodiments, it is envisioned that the protective layer 103 may be applied using a transfer film and/or a transfer lamination process.

Thus, the heat resistant protection layer 103 serves as a protective energy shield and/or heat sink. For example, the protection layer 103 acts as a heat sink that prevents the transmission of heat energy, or as a shield to other activating energies (i.e., UV, microwave, optical, IR, chemical activators, etc.) to the security elements 106 thus protecting the counterfeit-deterrence properties to an extent that the integrity of the security elements 106 will not be compromised (e.g., distort, degrade, break, alter color, alter texture, etc.). In some embodiments, the protective layer 103 may serve as both a heat sink and as a shield against other activation energies, for example, UV light.

Therefore, in those embodiments that use heat as the activation energy, the protection provided by protection layer 103 eliminates the need for specially configuring the heating/sealing plate/platen of the blister pack packaging system. Indeed, the protective layer enables the use of standard, flat, heating plates to seal the lidding film to with integrated security elements 106 onto a blister pack (such as shown in cut-away, in FIG. 1) without degrading such security elements. The manufacturing process is therefore substantially simplified, rendering it much more cost effective.

Figure 2:
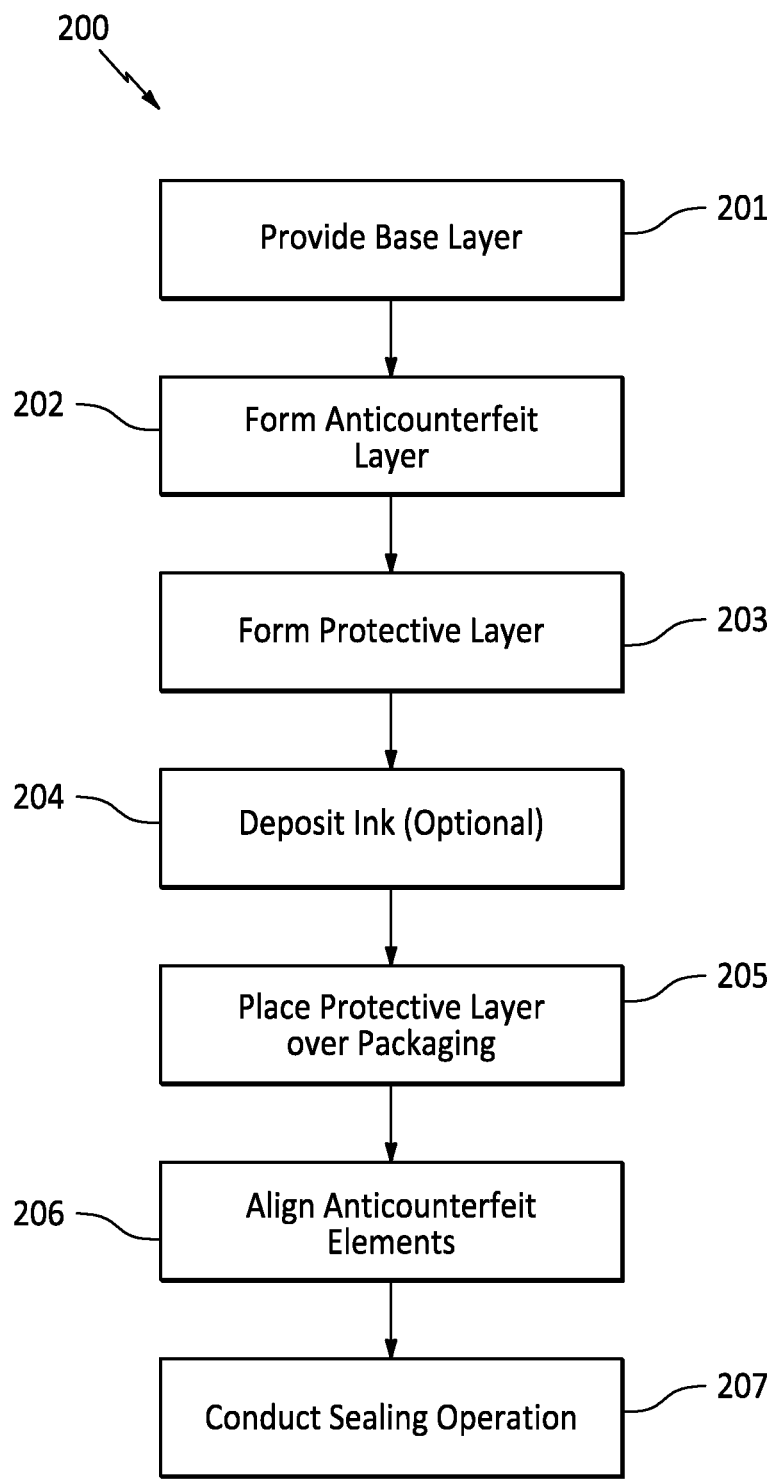
FIG. 2 is a flow chart illustrating a method of making a heat resistant multi-layer film according to an embodiment of the present invention.

Turning now to FIG. 2, a method 200 of manufacturing a multi-layer film 100 having a protection layer 103 is illustrated. In a first step 201, a base layer 101 is provided. In a second step 202, a security layer 102 with a plurality of security elements 106 is formed or deposited on top of a base layer 101. In a third step 203, the protection layer 103 is formed or deposited on top of security layer 102. Optionally, protection layer 103 may also be formed on top of base layer 101, sandwiching anti-counterfeit layer 102 between two protective layers. In an optional fourth step 204, an additional layer of ink or other material may be deposited on top of the protection layer 103.

With further reference to FIG. 2, additional steps may be employed depending on the end use for the film. For example, when using the film as a lidding material for a blister pack, in a fifth step 205, the multi-layer film 100 may be placed over the blister pack. In practice, this may be accomplished by unspooling/unwinding the multi-layer film 100 from a roll and placing it in close proximity to a blister pack sheet 104 with wells 104 containing product 105. As a sixth step 206, the multi-layer film 100 with security elements 106 may be aligned over the blister pack shown in FIG. 1 in such a fashion so that security elements 106 are aligned with wells 104. Finally, an activation energy (heat, UV rays, microwaves, mechanical pressure, etc.), such as heat applied from a heating plate/platen, is applied as a seventh step 207 sealing the multi-layer construct 100 to blister pack.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

In contrast to existing systems/methods, the protective layer and multi-layer film disclosed herein allows for the use of security elements in blister packs and other applications without the need for customized tooling, molds, or manufacturing devices (such as specialized heating plates). This decreases the overhead required to start a manufacturing process and increases the overall utility of a multi-layer film incorporating the protective layer.

Finally, the written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A method of protecting security elements deposited on a substrate from heat degradation during a heat sealing process, said method comprising the steps of:
    providing a security element on said substrate, wherein the security element is at least one of: an embossed hologram, microprinted words or images, an embossed pattern and a security strip, wherein said substrate is made of paper or metallic foil and said security element and said substrate are coextensive;
    applying a heat resistant coating directly over and in contact with said security element after said step of providing said security element on said substrate, said heat resistant coating being formed from a semi-crystalline polymer having a glass transition temperature in the range of 85° C. to about 165° C.;
    providing an adhesive layer on said substrate opposite said security element; and
    with said heat resistant coating atop said security element, and said adhesive layer on said substrate opposite said security element, sealing said substrate to a package housing.

2. The method according to claim 1, wherein: said security element is an embossed hologram.

3. The method according to claim 2, wherein: said sealing is accomplished with a die, said die having a substantially uniform heating profile.

4. The method according to claim 1, further comprising the step of: prior to providing said security element on said substrate, applying a second heat resistant coating on top of said substrate to which said security element will be provided so that said security element is sandwiched between the heat resistant coating and the second heat resistant coating.

5. The method according to claim 1, wherein: the heat resistant coating includes two or more polymer materials each having a different glass transition temperature.

6. The method according to claim 1, wherein: the heat resistant coating is PMMA.

7. A method of protecting security elements deposited on a substrate from heat degradation during a heat sealing process, said method comprising the steps of:
    defining a security element on said substrate, wherein the security element is at least one of: an embossed hologram, microprinted words or images, an embossed pattern and a security strip, wherein said substrate is made of paper or metallic foil and said security element and said substrate are coextensive;
    applying a heat resistant coating atop said security element, said heat resistant coating being formed from a semi-crystalline polymer having a glass transition temperature in the range of 85° C. to about 165° C.;
    providing an adhesive layer on said substrate opposite said security element; and
    with said heat resistant coating atop said security element, and said adhesive layer on said substrate opposite said security element, sealing said substrate to a blister pack such that said heat resistant coating inhibits degradation of said security element due to heat.

8. The method according to claim 7, wherein: said security element is an embossed hologram.

9. The method according to claim 8, wherein: said sealing is accomplished with a die, said die having a substantially uniform heating profile.

10. The method of claim 7, wherein said heat resistant coating provides additional thermal protection if process deviations or unexpected increases in temperature occur.

11. A method of forming a multi-layer film, comprising:
    providing a base layer made up of paper or metallic foil;
    applying a security layer atop said base layer, said security layer having at least one security element, wherein the security element is at least one of: an embossed hologram, microprinted words or images, an embossed pattern and a security strip, wherein said security layer and said base layer are coextensive;
    applying a protection layer atop said security layer after applying the security layer atop the base layer; and
    providing an adhesive layer on said base layer opposite said security layer,
    wherein said protection layer is a quasi-crystalline polymer material having a glass transition temperature in the range of 85° C. to about 165° C.; and
    wherein said protection layer forms a permanent part of said multi-layer film and is configured to insulate said at least one security element from heat during application of said multi-layer film to a blister pack using a heat sealing process.

12. The method of claim 11, wherein the security element is an embossed hologram.

13. The method of claim 11, further comprising:
    placing the multi-layer film over the blister pack;
    aligning at least one security element over at least one well of the blister pack; and,
    applying an activation energy.

14. The method of claim 13 further comprising:
    applying an additional layer.

15. The method of claim 11, wherein said protection layer is applied using a transfer film and transfer lamination process.

\* \* \* \* \*